United States Patent
Copeland et al.

(10) Patent No.: US 7,317,426 B2
(45) Date of Patent: Jan. 8, 2008

(54) CORE ANTENNA FOR EAS AND RFID APPLICATIONS

(75) Inventors: Richard L. Copeland, Lake Worth, FL (US); Stewart E. Hall, Wellington, FL (US); William M. Farrell, West Palm Beach, FL (US)

(73) Assignee: Sensormatic Electronics Corporation, Boca Raton, FL (US)

( * ) Notice: Subject to any disclaimer, the term of this patent is extended or adjusted under 35 U.S.C. 154(b) by 7 days.

(21) Appl. No.: 11/051,235

(22) Filed: Feb. 4, 2005

(65) Prior Publication Data

US 2006/0176229 A1 Aug. 10, 2006

(51) Int. Cl.
*H01Q 7/08* (2006.01)
(52) U.S. Cl. .................... 343/788; 343/787
(58) Field of Classification Search ........... 343/788, 343/866, 867, 787, 741, 742
See application file for complete search history.

(56) References Cited

U.S. PATENT DOCUMENTS

| | | | |
|---|---|---|---|
| 3,721,989 A * | 3/1973 | Christensen | 343/701 |
| 4,193,076 A | 3/1980 | Ito et al. | |
| 4,407,000 A | 9/1983 | Sasaki et al. | |
| 4,805,232 A | 2/1989 | Ma | |
| 5,923,300 A * | 7/1999 | Mejia | 343/788 |
| 6,163,305 A * | 12/2000 | Murakami et al. | 343/788 |
| 2004/0061660 A1* | 4/2004 | Yoshida et al. | 343/788 |
| 2004/0135690 A1 | 7/2004 | Copeland et al. | |
| 2004/0252068 A1* | 12/2004 | Hall et al. | 343/788 |
| 2005/0162331 A1* | 7/2005 | Endo et al. | 343/788 |

FOREIGN PATENT DOCUMENTS

EP 1489635 A2 12/2004

* cited by examiner

*Primary Examiner*—Hoanganh Le
(74) *Attorney, Agent, or Firm*—Alan M. Weisberg; Christopher & Weisberg, P.A.

(57) ABSTRACT

A core antenna system for use in electronic article surveillance (EAS) and radio frequency identification (RFID) systems. The core antenna system may include a core antenna. The core antenna may include a core, a first resonant winding disposed around at least a portion of the core, the first resonant winding having a first number of winding turns N1, and a second non-resonant winding disposed around at least a portion of the core, the second non-resonant winding having a second number of winding turns N2, the second number of turns greater than or equal to the first number of turns. The core antenna may be mounted on a shield plate and tuned to an operating frequency on the shield plate such that when the shielded core antenna is further mounted on a mounting surface, e.g., of a checkstand, no significant detuning of the antenna takes place.

27 Claims, 7 Drawing Sheets

500

| | Antenna in Free space | Antenna mounted on shield plate (same N2/N1) | Antenna mounted on shield plate (Adjusted N2/N1) |
|---|---|---|---|
| N2/N1 | 0.25 | 0.25 | 1.0 |
| Q | 23.0 | 8.0 | 8.0 |
| sensitivity | x | 8/23x | 2x |

FIG. 5

CORE ANTENNA FOR EAS AND RFID APPLICATIONS

FIELD

This disclosure relates to core antennas, and, in particular, to core antennas for electronic article surveillance (EAS) and radio frequency identification (RFID) systems.

BACKGROUND

EAS and RFID systems are typically utilized to protect and/or track assets. In an EAS system, an interrogation zone may be established at the perimeter, e.g. at an exit area, of a protected area such as a retail store. The interrogation zone is established by an antenna or antennas positioned adjacent to the interrogation zone.

EAS markers are attached to each asset to be protected. When an article is properly purchased or otherwise authorized for removal from the protected area, the EAS marker is either removed or deactivated. If the marker is not removed or deactivated and moved into the interrogation zone, the electromagnetic field established by the antenna(s) causes a response from the EAS marker. An antenna acting as a receiver detects the EAS marker's response indicating an active marker is in the interrogation zone. An associated controller provides an indication of this condition, e.g., an audio alarm, such that appropriate action can be taken to prevent unauthorized removal of the item to which the marker is affixed from the protected area.

An RFID system utilizes an RFID marker to track articles for various purposes such as inventory. The RFID marker stores data associated with the article. An RFID reader may scan for RFID markers by transmitting an interrogation signal at a known frequency. RFID markers may respond to the interrogation signal with a response signal containing, for example, data associated with the article or an RFID marker ID. The RFID reader detects the response signal and decodes the data or the RFID tag ID. The RFID reader may be a handheld reader, or a fixed reader by which items carrying an RFID marker pass. A fixed reader may be configured as an antenna located in a pedestal similar to an EAS system.

Historically, transmitting, receiving, or transceiver antennas in EAS and RFID systems have been configured as loop-type antennas. A drawback with such loop antennas is that they may be easily de-tuned when installed directly on metal structures, e.g., metal structures in the checkstands of a supermarket, drug store, hypermarket, etc. In addition, the sensitivity of such loop antennas may be adequate in free space. However, the sensitivity of such loop antennas when installed directly on metal structures may also be degraded compared to their sensitivity in free space.

Magnetic core antenna configurations have also been explored for use in such EAS and RFID systems. The core may be formed of a pressed powdered iron or any other suitable magnetic material such as ferrite, an amorphous laminated core, or a nanocrystalline laminated core, etc. A ferrite core antenna may have a high sensitivity and a high quality factor (Q) in free space, which may also make it susceptible to de-tuning and a reduction in sensitivity when placed directly on metal surfaces. One solution to this problem is to space the core antenna off the mounting surface by a mounting distance, e.g., four to five centimeters. However, this spacing solution requires a protrusion of the antenna into an environment where there is a premium on such space. For example, the antenna may protrude into a narrow checkout aisle passageway interfering with customers.

Accordingly, there is a need for a core antenna for EAS and RFID applications to be relatively insensitive to de-tuning when mounted on or near metallic structures, e.g., a checkstand. In addition, there is a need for such an antenna to also maintain relatively high output sensitivity for detection and to not protrude appreciably away from the mounting surface.

BRIEF DESCRIPTION OF THE DRAWINGS

Features and advantages of embodiments of the claimed subject matter will become apparent as the following Detailed Description proceeds, and upon reference to the Drawings, where like numerals depict like parts, and in which:

FIG. 5 is a table comparing the sensitivity and quality factor of the antenna of FIG. 2 under various conditions;

Although the following Detailed Description will proceed with reference being made to illustrative embodiments, many alternatives, modifications, and variations thereof will be apparent to those skilled in the art. Accordingly, it is intended that the claimed subject matter be viewed broadly.

DETAILED DESCRIPTION

For simplicity and ease of explanation, various core antenna embodiments will be described herein in connection with EAS systems. Such core antenna embodiments may, however, be used in connection with an RFID system. It is to be understood, therefore, that the embodiments described herein are presented by way of illustration, not of limitation.

Figure 1:
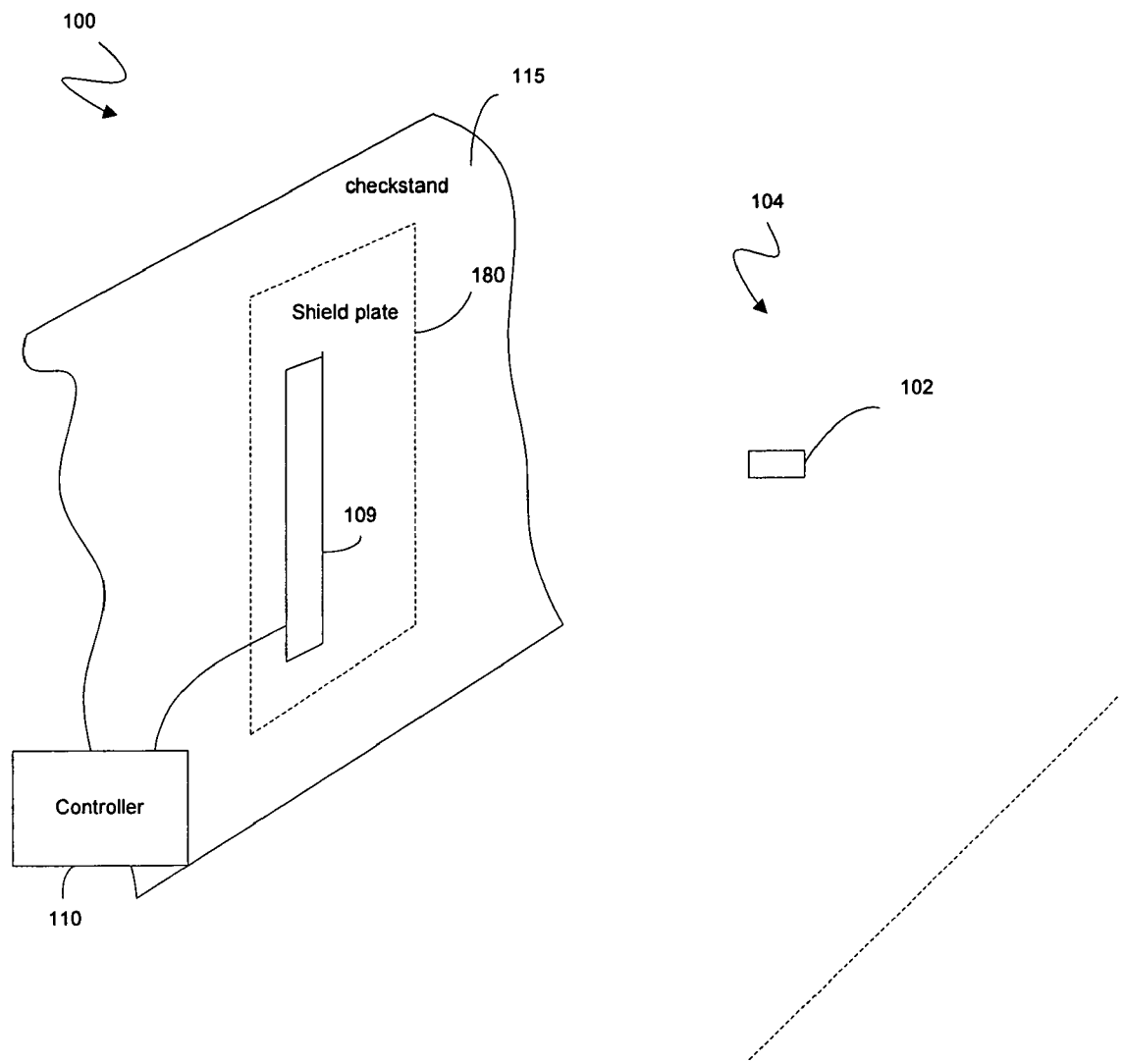
FIG. 1 is block diagram of an exemplary EAS system.

Turning to FIG. 1, there is illustrated an EAS system 100 including a core antenna 109 consistent with an embodiment. The EAS system 100 generally includes a controller 110 and the core antenna 109. The core antenna 109 may be mounted in a housing (not shown) such as a pedestal. The controller 110 may also be mounted in the same housing. The core antenna 109 may also be mounted on a shield plate 180, and the shield plate may in turn be mounted on a checkstand 115.

In the embodiment of FIG. 1, the antenna 109 may be configured as a transceiver antenna and the associated controller 110 may include proper control and switching to switch from transmitting to receiving functions at predetermined time intervals. Those skilled in the art will recognize that there may be a separate transmitting antenna and receiving antenna located on separate sides of the interrogation zone 104 and the core antenna 109 may be utilized as each.

An EAS marker 102 is placed, e.g. at a manufacturing facility or retail establishment, on each item or asset to be protected. If the marker is not removed or deactivated prior to entering an interrogation zone 104, the electromagnetic field established by the antenna will cause a response from the EAS marker 102. The core antenna 109 acting as a receiver will receive this response, and the controller 110 will detect the EAS marker response indicating that the marker is in the interrogation zone 104.

Figure 2:
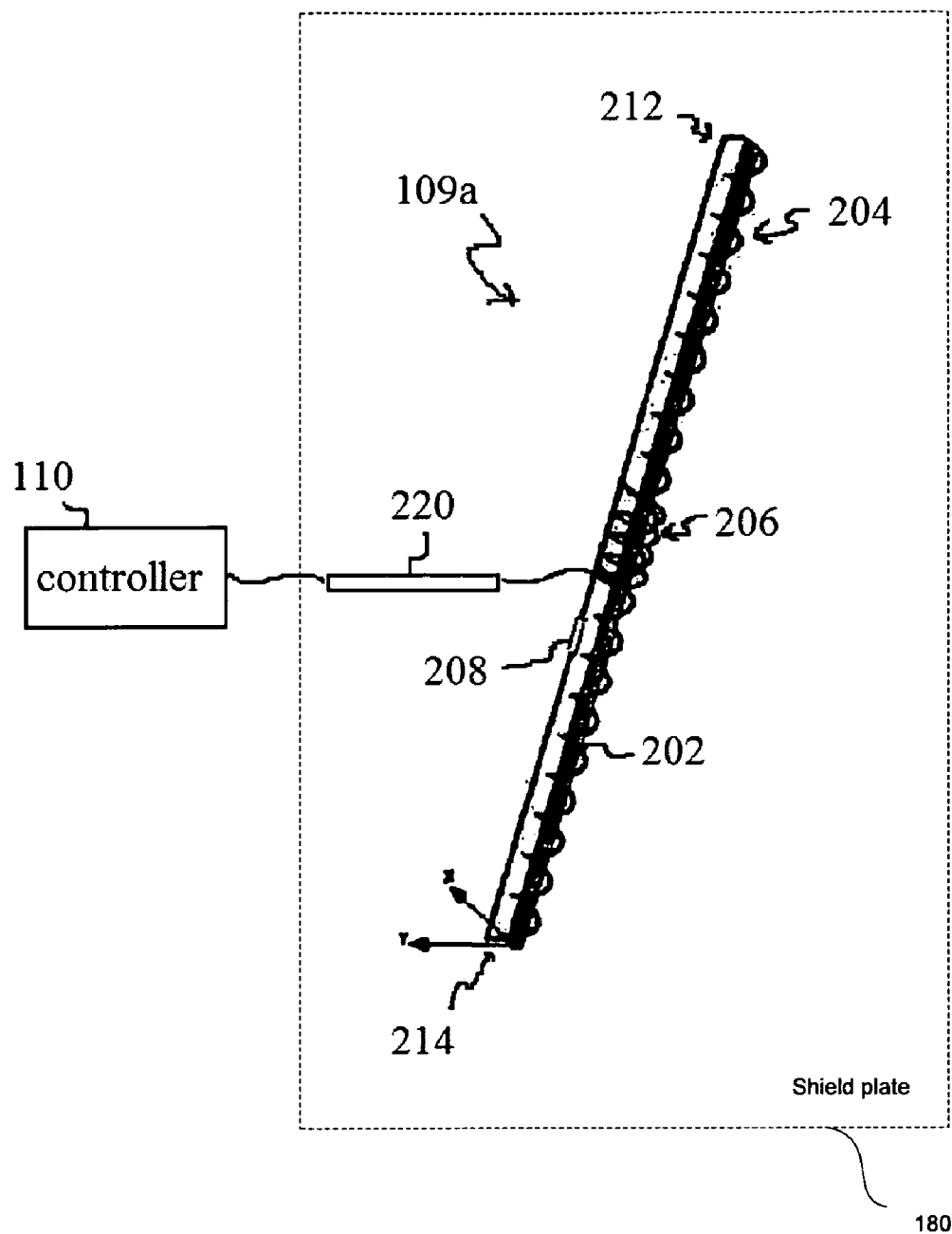
FIG. 2 is a block diagram of one embodiment of a core antenna that may be utilized in the system of FIG. 1 illustrating a primary resonant coil winding and a secondary non-resonant coil winding for transmitter, receiver, or transceiver mode operation.

FIG. 2 illustrates a perspective view of an embodiment 109a of a core antenna that may be utilized as the core antenna 109 of FIG. 1. The core antenna 109a may include a core 202, a primary resonant winding 204, and a secondary non-resonant winding 206. The magnetic properties and the geometry of the core 202 may be optimized for a particular application. The shape of the core 202 may be any of a variety of shapes, e.g. rectangular, cylindrical, spherical, etc. The core 202 may be formed of a pressed powdered iron or any other suitable magnetic material such as ferrite, an amorphous laminated core, or a nanocrystalline laminated core, etc.

The nanocrystalline laminated core may include stacked ribbons of nanocrystalline material laminated together with a suitable insulation coating to electrically isolate each ribbon from adjacent ribbons. The nanocrystalline material may exhibit excellent high frequency behavior, and may be characterized by constituent grain sizes in the nanometer range. The term "nanocrystalline material" as used herein refers to material including grains having a maximum dimension less than or equal to 40 nm. Some materials have a maximum dimension in a range from about 10 nm to 40 nm. Exemplary nanocrystalline materials may include alloys such as FeCuNbSiB, FeZrNbCu, and FeCoZrBCu. These alloys are commercially available under the names FINEMET, NANOPERM, and HITPERM, respectively.

The primary resonant winding 204 may be a wire coil winding wound about the core 202 a first number of winding turns N1. The primary winding 204 may also be wound about the entire length of the core 202 with the start end 212 and finish end 214 of the primary winding 204 coupled in series through a resonating capacitor 208. As is known to those skilled in the art, the value of resonating capacitor 208 may be adjusted to resonate or tune the antenna at the desired operating frequency, e.g., at 58 kHz in one instance. The primary resonant winding 204 may also be secured about the length of the core 202 by using dielectric tape.

A secondary non-resonant winding 206 may then be wound about the core 202 a second number of winding turns N2. The secondary non-resonant winding 206 may be wound on top of the primary winding 204 and may be inductively coupled to the primary resonant winding 204. The secondary non-resonant winding 206 may also be coupled to a transmission line or cable 220, which in turn may be coupled to the controller 110. The controller 110 may have appropriate excitation and detection circuitry to support both transmit and/or receive functions.

The controller 110 may be adapted to operate using pulsed or continuous waveform detection schemes, including swept frequency, frequency hopping, frequency shift keying, amplitude modulation, frequency modulation, and the like depending on the specific design of the system. For instance, the controller 110 may provide a limited duration pulse at a given operating frequency, e.g., 8.2 MHz, to the transmission line or cable 220 during transmission. The pulse may be transmitted via the transmission line or cable 220 to the core antenna load. The transmission line cable may have an impedance, e.g., 50 ohms, that matches the signal generator impedance to prevent reflections. At lower frequencies, e.g. 58 kHz, the transmission line or cable 220 is not important in impedance matching.

When the antenna 109a is utilized as a receive antenna, the sensitivity of the antenna to an external magnetic field signal is an important parameter of the receive antenna. It is generally desirable to have a higher sensitivity to detect relatively smaller external magnetic field signals. The sensitivity of the antenna may be measured as a function of the output voltage induced by an applied external magnetic field. The sensitivity of the receive antenna may generally vary proportionally with the quality factor (Q) of the antenna if the ratio of the number of turns N2 of the secondary non-resonant winding 206 to the number of turns N1 of the primary resonant winding 204 (ratio N2/N1) remains constant. The quality factor (Q) is given by equation (1):

$$Q=2\text{B}fL/R;  \qquad \text{a.}$$

where f is the operating frequency of the antenna, L is the equivalent inductance of the wound core, and R is the equivalent real impedance at the operating frequency.

The core antenna 109a may also be mounted on a shield plate 180. The shield plate 180 may be any variety of material similar to the checkstand 115 to which the shielded core antenna may be mounted. Such material may include, but not be limited to, aluminum, magnetic steel, and cold rolled steel. Once mounted to the shield plate 180, the core antenna 109a may then be tuned to the desired operating frequency, e.g., by adjusting the resonating capacitor 208, while mounted to the shield plate 180. Advantageously therefore, when the shielded core antenna is placed directly on materials that are either conducting or ferrous, e.g., a checkstand 115, there is no significant de-tuning as there is a minimal change in the resonant frequency of the antenna 109a.

When the core antenna 109a is placed on the shield plate 180, Q may be decreased and the sensitivity may be proportionately decreased as well if the N2/N1 ratio remains constant. This sensitivity loss may, however, be compensated for by increasing the N2/N1 ratio. Furthermore, the impedance of the core antenna 109a as viewed from the secondary non-resonant winding 206 may increase as $(N2/N1)^2$. Thus, a higher sensitivity antenna with the same spectral response is possible. This may occur when the receiver input impedance is high compared to the input impedance of the core antenna. That is, the receiver electronics' output impedance does not load down the core antenna impedance.

Figure 3:
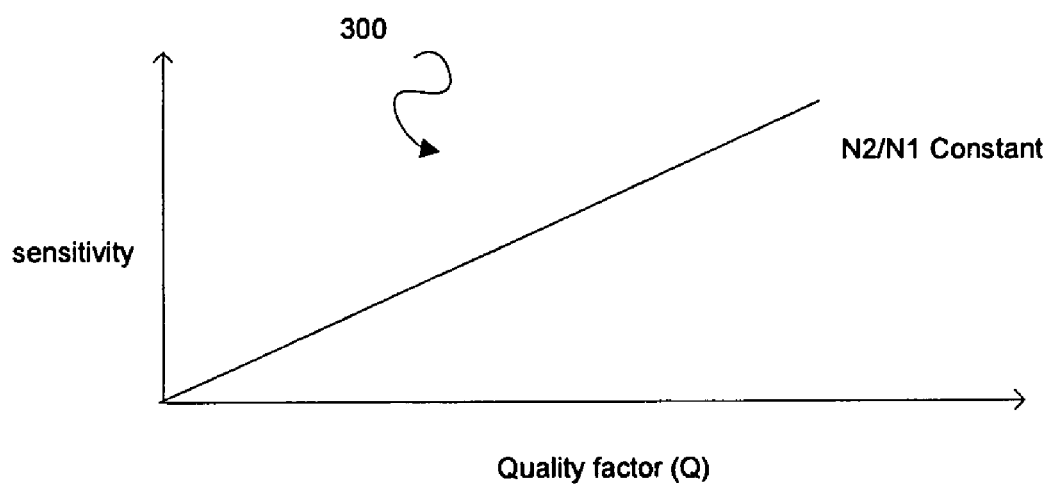
FIG. 3 is a plot of sensitivity versus quality factor for the antenna of FIG. 2.

FIG. 3, for example, illustrates a plot 300 of sensitivity versus Q for an antenna with a fixed ratio N2/N1 of the number of turns N2 of the secondary non-resonant winding 206 to the number of turns N1 of the primary resonant winding 204. As illustrated, without changing the N2/N1 ratio, a decrease in Q will result in an associated decrease in sensitivity.

Figure 4:
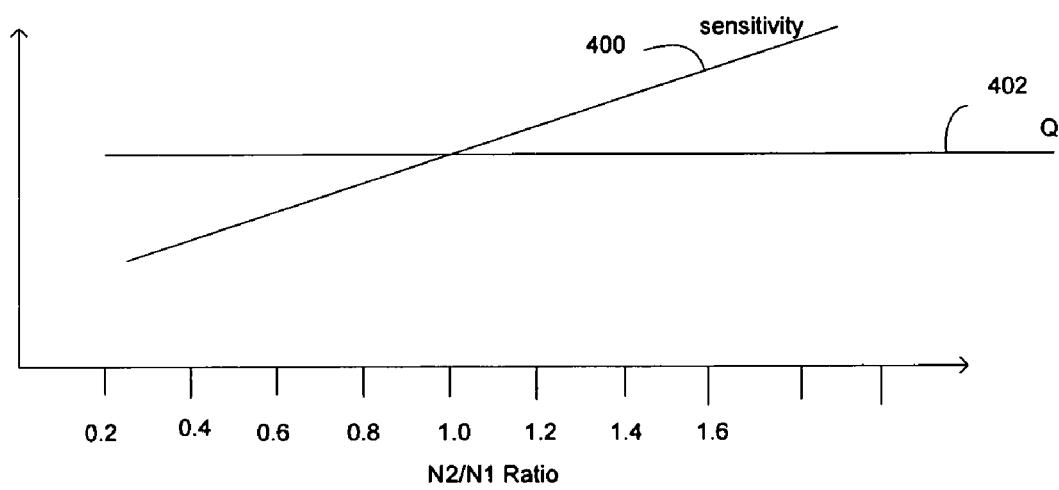
FIG. 4 is a plot of quality factor and sensitivity versus a ratio of a number of turns of the primary resonant winding to a number of turns of the secondary non-resonant winding for the antenna of FIG. 2.

FIG. 4 illustrates a plot 400 of the sensitivity and a plot 402 of Q versus the N2/N1 ratio. As the N2/N1 ratio increases, the sensitivity of the receive antenna increases while Q remains constant. Advantageously, this enables the ratio N2/N1 to be adjusted upward in order to increase the sensitivity of the antenna while not affecting Q. In one instance, this N2/N1 ratio may be adjusted after the antenna 109a is mounted to the shield plate 180 in order to increase the sensitivity of the receive antenna without altering Q.

FIG. 5 is a table 500 of the N2/N1 ratio, Q, and relative sensitivity values for one of many examples. The table 500 illustrates a core antenna, e.g., core antenna 109a of FIG. 2, may have an initial N2/N1 ratio of 0.25, a Q of 23, and a sensitivity of x in free space. When the core antenna having the same N2/N1 ratio is mounted on the shield plate 180, the Q may decrease to 8 and the sensitivity may decrease proportionately to 8/23x. However, this sensitivity loss may be compensated for by increasing the N2/N1 ratio. If the N2/N1 ratio is increased from 0.25 to unity or 1.0, the sensitivity may increase to nearly twice 2x that of the sensitivity x of the same antenna in free space with a N2/N1 ratio of 0.25. Therefore, the lost sensitivity caused by mounting the antenna 109a on the shield plate 180 can be compensated for by increasing the N2/N1 ratio. Increasing the N2/N1 ratio to unity or 1.0 was found to adequately compensate for such sensitivity losses.

Figure 6:
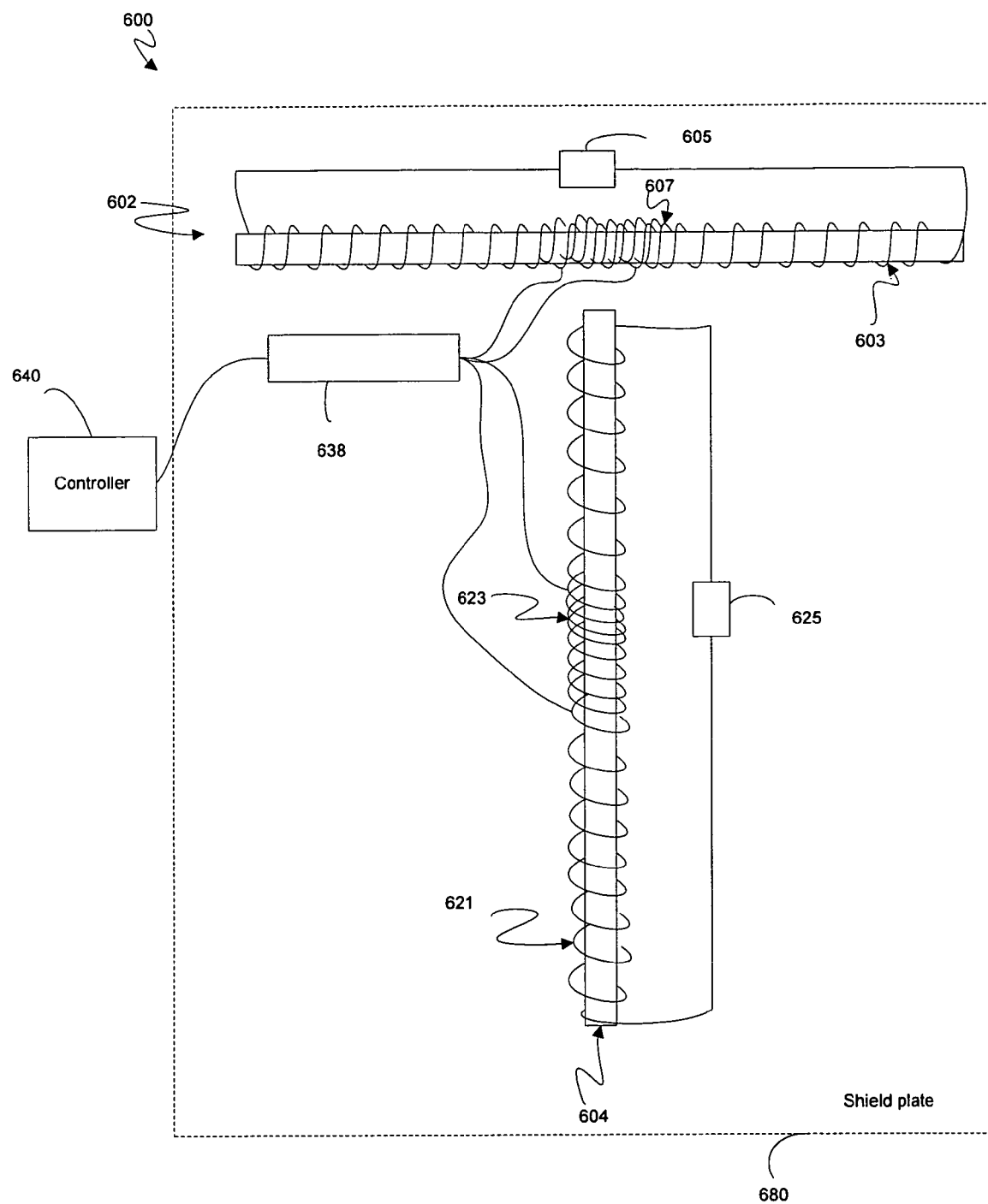
FIG. 6 is a block diagram of another embodiment of a core antenna system having two orthogonal core antennas.

FIG. 6 illustrates a core antenna system embodiment 600 utilizing a pair of orthogonal core antennas 602, 604 that may be situated in a common plane. Core antennas 602 and 604 may be consistent with the core antenna 109a embodiment of FIG. 2. For example, the first core antenna 602 oriented in a horizontal direction may have a primary resonant winding 603 and a secondary non-resonant winding 607. The primary resonant winding 603 may be coupled in series with a resonanting capacitor 605. Similarly, the second core antenna 604 oriented in a vertical direction may have a primary resonant winding 621 and a secondary non-resonant winding 623. The primary resonant winding 621 may be coupled in series with a resonant capacitor 625. Each core antenna 602, 604 may be individually sequenced by the controller 640 or combined together simultaneously. When combined together simultaneously, each secondary non-resonant winding 607 and 623 of each associated core antenna 602, 604 may be coupled to the transmission line or cable 638. The core antennas 602, 604 may also be mounted on a shield plate 680 and tuned while mounted on the shield plate. Again, that way when the shielded core antennas 602, 604 are mounted on various materials that are either conducting or ferrous, e.g., the checkstand 115, there is minimal change in the resonant frequency of the antennas 602, 604. The properties of the shield plate 680 may be similar to that of the shield plate 180. The core antenna system 600 may provide improved orientation sensitivity for detection when used as the receive antenna in an EAS or RFID system.

Figure 7:
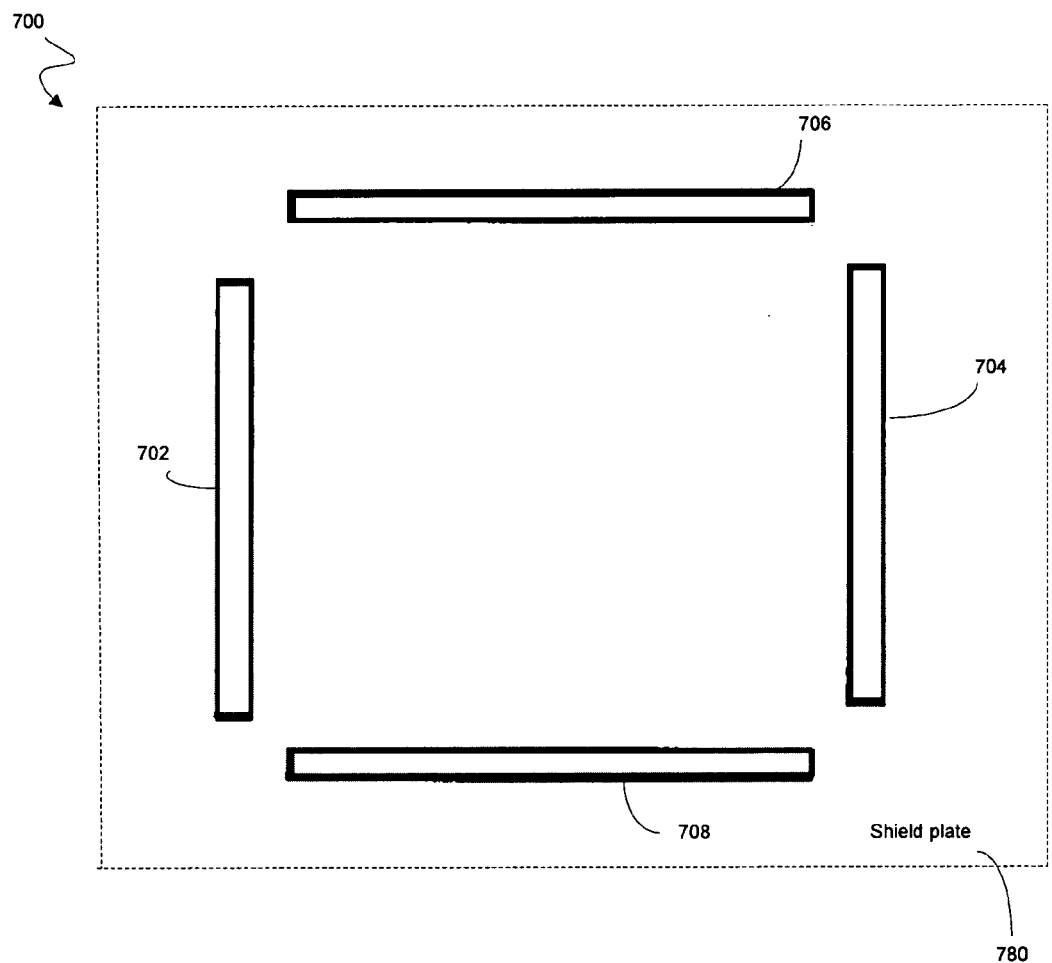
FIG. 7 is a block diagram of another embodiment of a core antenna system having four core antennas.

FIG. 7 illustrates yet another core antenna embodiment 700 utilizing four core antennas 702, 704, 706, 708 that may be situated in a common plane. Each core antenna 702, 704, 706, 708 may be consistent with the core antenna embodiment 109a of FIG. 2. Two of the core antennas 702, 704 may be orientated in a vertical direction and two other core antennas 706, 708 may be orientated in a horizontal direction. The two vertically orientated core antennas 702, 704 may be spaced apart from each other by a distance slightly greater than the length of the horizontally orientated core antennas 706, 708. Similarly, the two horizontally orientated core antennas 706, 708 may be spaced apart from each other by a distance slightly greater than the length of the vertically orientated core antennas 702, 704. As with the embodiment of FIG. 6, each core antenna 702, 704, 706, 708 may be individually sequenced by an associated controller (not illustrated) or combined together simultaneously. The core antenna embodiment 700 may also be mounted to a shield plate 780 and tuned while mounted on the shield plate.

In summary, a core antenna system for use in an EAS or RFID detection system may include a core antenna. The core antenna may include a core, a first resonant winding disposed around at least a portion of the core, the first resonant winding having a first number of winding turns N1, and a second non-resonant winding disposed around at least a portion of the core, the second non-resonant winding having a second number of winding turns N2, the second number of turns greater than or equal to the first number of turns.

Another embodiment may include a method. The method may include mounting a core antenna to a shield plate to form a shielded core antenna, and tuning the shielded core antenna to an operating frequency of an EAS or RFID system.

Yet another embodiment may include an EAS or RFID system. The system may include a core antenna system. The core antenna system may include a core antenna. The core antenna may include a core, a first resonant winding disposed around at least a portion of the core, the first resonant winding having a first number of winding turns N1, and a second non-resonant winding disposed around at least a portion of the core, the second non-resonant winding having a second number of winding turns N2, the second number of turns greater than or equal to the first number of turns. The core antenna system may further include a controller coupled to the second non-resonant winding to receive a signal from the second non-resonant winding.

Yet another embodiment may include an antenna system for use in an EAS or RFID detection system. The antenna system may include a first core antenna and a second core antenna, the first core antenna orthogonal to the second antenna and the first and second core antenna situated in a common plane.

Yet another embodiment may include an antenna system for use in an EAS or RFID detection system. The antenna system may include a first core antenna and a second core antenna each having a length oriented in a horizontal direction, a third and fourth core antenna each having a length oriented orthogonal to the first and second core antenna. The first, second, third and fourth core antennas may each be situated in a common plane.

Advantageously, the core antenna of these embodiments may be utilized as a receiver antenna with relatively high sensitivity in EAS and RFID systems. The sensitivity may be increased by adjusting the ratio of the number of winding turns N2 of the secondary non-resonant winding to the number of turns N1 of the primary resonant winding.

The core antennas of these embodiments may also be mounted on a shield plate and then tuned to an operating frequency. When the shield plate is then installed in the field on or near metallic surfaces such as may be found on a checkstand, the shielded core antenna remains relatively insensitive to de-tuning. This prevents the appreciable amounts of de-tuning that may otherwise occur that would either degrade performance of the associated EAS or RFID system and/or require tuning in the field during installation. Furthermore, the shielded core antenna may also be mounted in areas requiring a low profile, e.g., near a check out aisle, such that the shielded receiver antenna does not protrude appreciably away from the mounting surface.

The terms and expressions which have been employed herein are used as terms of description and not of limitation, and there is no intention, in the use of such terms and expressions, of excluding any equivalents of the features shown and described (or portions thereof), and it is recognized that various modifications are possible within the scope of the claims. Other modifications, variations, and alternatives are also possible. Accordingly, the claims are intended to cover all such equivalents.

What is claimed is:

1. A core antenna system for use in an EAS or RFID detection system, said core antenna system comprising:
a core antenna, said core antenna comprising:
a core;
a first resonant winding disposed around at least a portion of said core, said first resonant winding having a first number of winding turns N1; and
a second non-resonant winding disposed around at least a portion of said core, said second non-resonant winding having a second number of winding turns N2, wherein N2 is greater than or equal to N1.

2. The core antenna system of claim 1, further comprising a shield plate, said core antenna mounted to said shield plate.

3. The core antenna system of claim 2, wherein said shield plate is selected from the group consisting of aluminum, magnetic steel, and cold rolled steel.

4. The core antenna system of claim 2, wherein said core antenna at least partially contacts said shield plate.

5. The core antenna system of claim 1, further comprising a transmission line having one end coupled to a controller of said EAS or RFID system and another end coupled to said second non-resonant winding.

6. The core antenna system of claim 5, wherein said second non-resonant winding is inductively coupled to said first resonant winding.

7. The core antenna system of claim 1, wherein said first resonant winding is coupled in series to a resonating capacitor, wherein said core antenna is tuned to an operating frequency of said EAS or REID system by adjusting said resonating capacitor.

8. An antenna system for use in an EAS or RFID detection system, said antenna system comprising:
a first core antenna and a second core antenna, said first core antenna orthogonal to said second core antenna and said first and second core antenna situated in a common plane, and
a transmission line having one end coupled to a controller of the EAS or RFID system and another end coupled to each of said first core antenna and said second core antenna.

9. The antenna system of claim 8, wherein said first and second core antenna each comprise a core, a resonant winding disposed around at least a portion of said core, said resonant winding having a first number of winding turns N1, and a non-resonant winding disposed around at least a portion of said core, said non-resonant winding having a second number of winding turns N2, wherein N2 is greater than or equal to N1.

10. The antenna system of claim 9, further comprising a shield plate, said first and second core antenna mounted to said shield plate.

11. The antenna system of claim 10, wherein said shield plate is selected from the group consisting of aluminum, magnetic steel, and cold rolled steel.

12. The antenna system of claim 10, wherein said first and second core antenna at least partially contact said shield plate.

13. An antenna system for use in an EAS or RFID detection system, said antenna system comprising:
a first core antenna and a second core antenna, said first core antenna orthogonal to said second core antenna and said first and second core antenna situated in a common plane wherein said first and second core antenna each comprise a core, a first resonant winding disposed around at least a portion of said core, said first resonant winding having a first number of winding turns N1, and a second non-resonant winding disposed around at least a portion of said core, said second non-resonant winding having a second number of winding turns N2, wherein N2 is greater than or equal to N1.

14. The antenna system of claim 13, further comprising a shield plate, said first and second core antenna mounted to said shield plate.

15. The antenna system of claim 14, wherein said shield plate is selected from the group consisting of aluminum, magnetic steel, and cold rolled steel.

16. The antenna system of claim 14, wherein said first and second core antenna at least partially contact said shield plate.

17. The antenna system of claim 13, further comprising a transmission line having one end coupled to a controller of said EAS or RFID system and another end coupled to both said second non-resonant windings of said first and second core antennas.

18. An antenna system for use in an EAS or RFID detection system, said antenna system comprising:
a first core antenna and a second core antenna each having a length oriented in a horizontal direction, a third and fourth core antenna each having a length oriented orthogonal to said first and second core antenna, said first, second, third, and fourth core antennas situated in a common plane, and
a transmission line having one end coupled to a controller of said EAS or RFID system and another end coupled to each said first, second, third, and fourth core antennas.

19. The antenna system of claim 18, wherein said first and second core antenna each comprise a core, a resonant winding disposed around at least a portion of said core, said resonant winding having a first number of winding turns N1, and a non-resonant winding disposed around at least a portion of said core, said non-resonant winding having a second number of winding turns N2, wherein N2 is greater than or equal to N1.

20. The antenna system of claim 19, further comprising a shield plate, said first and second core antenna mounted to said shield plate.

21. The antenna system of claim 20, wherein said shield plate is selected from the group consisting of aluminum, magnetic steel, and cold rolled steel.

22. The antenna system of claim 20, wherein said first and second core antenna at least partially contact said shield plate.

23. An antenna system for use in an EAS or RFID detection system, said antenna system comprising:
a first core antenna and a second core antenna each having a length oriented in a horizontal direction, a third and fourth core antenna each having a length oriented orthogonal to said first and second core antenna, said first, second, third, and fourth core antennas situated in a common plane wherein said first, second, third, and fourth core antennas each comprise a core, a first resonant winding disposed around at least a portion of said core, said first resonant winding having a first number of winding turns N1, and a second non-resonant winding disposed around at least a portion of said core, said second non-resonant winding having a second number of winding turns N2, wherein N2 is greater than or equal to N1.

24. The antenna system of claim 23, further comprising a shield plate, said first, second, third, and fourth core antennas mounted to said shield plate.

25. The antenna system of claim 24, wherein said shield plate is selected from the group consisting of aluminum, magnetic steel, and cold rolled steel.

26. The antenna system of claim 24, wherein said first, second, third, and fourth core antennas at least partially contact said shield plate.

27. The antenna system of claim 23, further comprising a transmission line having one end coupled to a controller of said EAS or RFID system and another end coupled to each of said second non-resonant windings of said first, second, third, and fourth core antennas.

* * * * *